US012728459B2

(12) United States Patent
Chaudhry et al.

(10) Patent No.: US 12,728,459 B2
(45) Date of Patent: Sep. 8, 2026

(54) ANOMALY DETECTION IN ADDITIVE MANUFACTURING USING MELTPOOL MONITORING, AND RELATED DEVICES AND SYSTEMS

(71) Applicant: BAKER HUGHES OILFIELD OPERATIONS LLC, Houston, TX (US)

(72) Inventors: Gunaranjan Chaudhry, Bangalore (IN); Jayesh Rameshlal Jain, The Woodlands, TX (US); Thomas Dobrowolski, The Woodlands, TX (US); Chad Yates, Houston, TX (US); Aaron Avagliano, Tomball, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 324 days.

(21) Appl. No.: 18/548,160

(22) PCT Filed: May 24, 2021

(86) PCT No.: PCT/US2021/033906

§ 371 (c)(1),
(2) Date: Aug. 28, 2023

(87) PCT Pub. No.: WO2022/186847

PCT Pub. Date: Sep. 9, 2022

(65) Prior Publication Data

US 2024/0131591 A1 Apr. 25, 2024
US 2024/0227019 A9 Jul. 11, 2024

(30) Foreign Application Priority Data

Mar. 1, 2021 (IN) ............................ 202111008523

(51) Int. Cl.
*B33Y 50/02* (2015.01)
*B22F 10/31* (2021.01)
(Continued)

(52) U.S. Cl.
CPC .............. *B22F 10/85* (2021.01); *B22F 10/31* (2021.01); *B22F 10/34* (2021.01); *B22F 10/366* (2021.01); *B33Y 50/02* (2014.12)

(58) Field of Classification Search
CPC .......... B22F 10/85; B22F 10/31; B22F 10/34; B22F 10/366; B22F 10/20; B33Y 50/02;
(Continued)

(56) References Cited

U.S. PATENT DOCUMENTS

2015/0217517 A1* 8/2015 Karpas .................. B29C 64/209
425/72.1
2015/0321422 A1* 11/2015 Boyer .................... B33Y 50/02
425/150

(Continued)

FOREIGN PATENT DOCUMENTS

CA 3064593 A1 11/2018
EP 3646968 A1 5/2020

(Continued)

OTHER PUBLICATIONS

Chinese Office Action and Search Report for Application No. 202180094827.1 dated Aug. 28, 2025, 20 pages with English translation.

(Continued)

*Primary Examiner* — Christopher E. Everett
(74) *Attorney, Agent, or Firm* — TraskBritt

(57) ABSTRACT

Methods for anomaly detection in additive manufacture using meltpool monitoring are disclosed. A method includes obtaining a process model representative of an object to be generated through additive manufacture. The method also
(Continued)

includes generating, based on the process model and using a hybrid machine-learning model, an instruction for generating the object through additive manufacture. Another method includes generating a layer of an object, and taking a reading relative to the generation of the layer. The other method also includes updating, based on the reading and using a hybrid machine-learning model, a process model, the process model representative of the object. The other method also includes generating, based on the updated process model and using the hybrid machine-learning model, an instruction for generating a subsequent layer of the object through additive manufacture. Related systems and devices are also disclosed.

15 Claims, 7 Drawing Sheets

(51) Int. Cl.
*B22F 10/34* (2021.01)
*B22F 10/366* (2021.01)
*B22F 10/85* (2021.01)

(58) Field of Classification Search
CPC .............. B33Y 10/00; G05B 19/41875; G05B 19/4099; B23K 26/342; G06N 20/00
See application file for complete search history.

(56) References Cited

U.S. PATENT DOCUMENTS

2015/0331402 A1* 11/2015 Lin ........................ G05B 15/02 700/119
2017/0144378 A1 5/2017 Giera
2018/0071987 A1* 3/2018 Tsumuraya ............ B33Y 10/00
2018/0079125 A1 3/2018 Perez et al.
2018/0243977 A1* 8/2018 Meinders ................ B22F 10/38
2018/0341248 A1 11/2018 Mehr et al.
2019/0004496 A1 1/2019 Blom et al.
2019/0134709 A1 5/2019 Dave et al.
2019/0283333 A1* 9/2019 Hwang .................. G06N 20/00
2019/0299536 A1 10/2019 Putman et al.
2020/0016883 A1* 1/2020 Reese .............. G05B 19/41875
2020/0096970 A1 3/2020 Mehr et al.
2020/0341452 A1 10/2020 Bi et al.
2020/0391447 A1 12/2020 Davis et al.
2021/0170676 A1* 6/2021 Kitchen .................. G06T 7/254
2022/0062997 A1* 3/2022 Liu ......................... B22F 10/50
2023/0415415 A1* 12/2023 Milshtein .............. B29C 64/386

FOREIGN PATENT DOCUMENTS

WO 2015-120200 A1 8/2015
WO 2019/055576 A1 3/2019
WO 2020/251550 A1 12/2020

OTHER PUBLICATIONS

International Search Report for International Application No. PCT/US2021/033906, mailed Dec. 1, 2021, 04 pages.
International Written Opinion for International Application No. PCT/US2021/033906, mailed Dec. 1, 2021, 05 pages.
Canadian Office Action for Application No. 3,209,921 date Mar. 6, 2026, 4 pages.
CN Office Action, Including Search report received for Chinese Patent Application No. 202180094827.1, mailed on Mar. 31, 2026, 18 pages (10 pages of English Translation and 8 pages of Original Document).

* cited by examiner

ANOMALY DETECTION IN ADDITIVE MANUFACTURING USING MELTPOOL MONITORING, AND RELATED DEVICES AND SYSTEMS

CROSS-REFERENCE TO RELATED APPLICATIONS

This application is a national phase entry under 35 U.S.C. § 371 of International Patent Application PCT/US2021/033906, filed May 24, 2021, designating the United States of America and published as International Patent Publication WO 2022/186847 A1 on Sep. 9, 2022, which claims the benefit under Article 8 of the Patent Cooperation Treaty to the Republic of India patent application No. 202111008523, filed Mar. 1, 2021.

FIELD

This description relates, generally, to anomaly detection in additive manufacturing. More specifically, some embodiments relate to using meltpool monitoring in anomaly detection in additive manufacture, without limitation.

BACKGROUND

Additive manufacturing (AM) generally involves generating an object (or part) by generating successive layers of the object.

Direct metal laser melting (DMLM) is an example of AM. DMLM involves laying a first layer of metal powder on a build plate within a chamber. A laser is used to melt the metal powder according to a first layer of a pattern for an object. The melted metal powder cools and hardens into a first layer of the object.

A second layer of metal powder is laid over the first layer of the object and the first layer of unmelted metal powder. The laser then melts the metal powder of the second layer according to a second layer of the pattern for the object. The melted metal powder of the second layer cools and hardens into a second layer of the object. Where the second layer touches the first layer, the first and second layers bond together.

This process is repeated until all of the layers of the object have been generated. Thereafter, the unmelted metal powder is removed.

A barrier to widespread adoption of additive manufacturing (AM) in production, and a concern from customers, is quality assurance of additively-manufactured objects. Various defects could be introduced during AM that can lead to object rejection or even failure in service. For example, deviations in temperature or air pressure within the chamber may affect temperature (and/or state, i.e., solid or molten) of the metal powder as it is struck by the laser. If the temperature is too hot, more of the powder than is indicated by the pattern may melt and adhere to the object. If the temperature is too low, less of the powder that is indicated by the pattern may melt leaving gaps in the object when the unmelted metal powder is removed.

BRIEF SUMMARY

Embodiments of the present disclosure may include a method. The method may include obtaining a process model representative of an object to be generated through additive manufacture. The method may also include, generating, based on the process model and using a hybrid machine-learning model, an instruction for generating the object through additive manufacture.

Another embodiment of the present disclosure may include a method. The method may include generating a layer of an object and taking a reading relative to the generation of the layer. The method may also include, updating, based on the reading and using a hybrid machine-learning model, a process model representative of the object. The method may also include, generating, based on the updated process model and using the hybrid machine-learning model, an instruction for generating a subsequent layer of the object through additive manufacture.

Another embodiment of the present disclosure may include a system. The system may include a simulator configured to generate a process model according to a build file. The process model may be representative of an object to be generated through additive manufacture. The system may also include a hybrid machine-learning model trained using simulated data and measured data. The hybrid machine-learning model may be configured to generate, based on the process model, an instruction for generating the object. The system may also include an object generator configured to generate an object through additive manufacture according to a build file and the instruction.

BRIEF DESCRIPTION OF THE DRAWINGS

While the specification concludes with claims particularly pointing out and distinctly claiming that which is regarded as the present disclosure, various features and advantages of embodiments of the disclosure may be more readily ascertained from the following description of embodiments of the disclosure when read in conjunction with the accompanying drawings.

DETAILED DESCRIPTION

Figure 1:
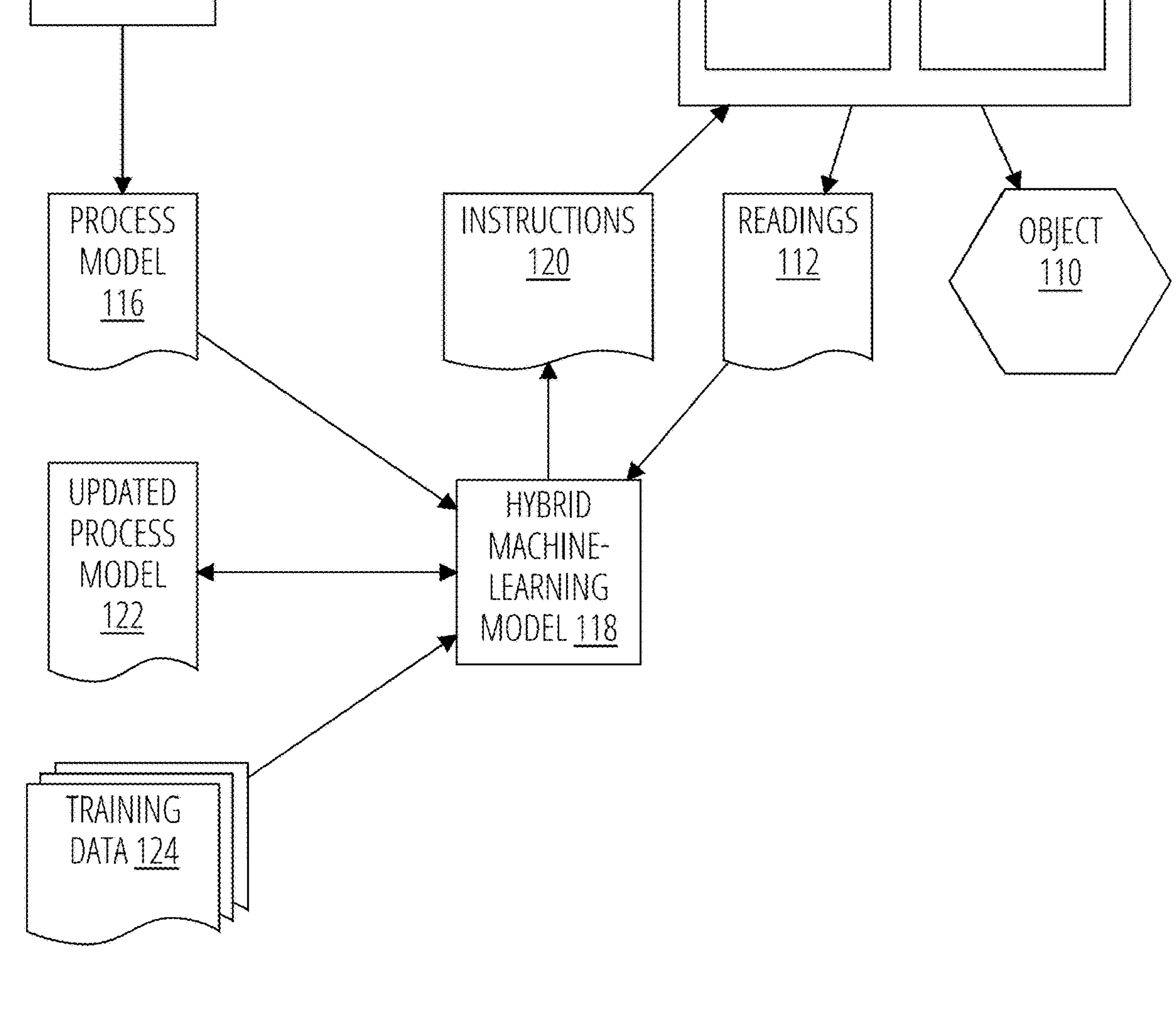
FIG. 1 is a functional block diagram illustrating an example system according to one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Some embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

A barrier to industrial adoption of AM, and a concern from customers, is quality assurance of additively manufactured objects. For example, various anomalies can occur during the direct metal laser melting (DMLM) build process affecting the object quality.

Some meltpool monitoring methods rely on past builds of the same part under the same build setup and chamber conditions to identify anomalies. This approach is often impractical for low to moderate volume production, which is a large portion of the current metal AM market.

Some embodiments disclosed herein relate to a technique that integrates design/slice information with meltpool monitoring data and process simulations to establish a mapping between predicted and actual values of equivalent quantities such as energy density, scaled temperature, and meltpool characteristics, using a hybrid machine-learning model. Anomalies are detected when the quantities derived from in-situ measurements depart from the expected values calculated using the mapping generated by the hybrid machine-learning model for the in-situ conditions. This significantly expands the applicability of anomaly detection to low/moderate volume parts that are built for the first time or built under a new setup or conditions. This adds the new capability to conduct in-situ volumetric inspection while additively manufacturing.

Additionally some approaches to anomaly detection in AM production rely purely on in-situ measurements and do not take into account scan patterns as well as input parameters. It is usually not possible to get an accurate anomaly detection model for a new part until several instances of that part have been printed to get a baseline.

Some embodiments disclosed herein relate to a technique that incorporates other available data that has not been used in anomaly detection approaches. It generates a customized process model for each unique object by incorporating scan-pattern-based process simulations as well as varying input parameters such as laser power, scan speed and hatch spacing. This makes it possible to have accurate anomaly detection for low-to-moderate-volume parts and even for low-volume, custom, and/or one-off parts.

Some approaches compare simulated and measured quantities. Such approaches fail to account for deviations introduced due to actual conditions in the build chamber that are not modeled. In contrast, some embodiments disclosed herein account for such effects by introducing their dependency in the mapping between predicted and actual values.

A large number of parameters affect measured thermal emissions. Thus, some meltpool-monitoring approaches fail whenever an object is built under different conditions than previous baseline builds of the same object. This makes anomaly detection using these meltpool-monitoring approaches inaccurate and limiting in practice.

Some embodiments disclosed herein relate to a technique that integrates design/slice information with meltpool monitoring data and process simulations to establish a mapping between predicted and actual values of equivalent quantities such as energy density, scaled temperature, and meltpool characteristics, using a hybrid machine-learning model. The hybrid machine-learning model is trained to include effect of various build and process parameters such as laser parameters, chamber conditions, and scan patterns. A process model can be used to predict the energy densities to improve the accuracy of the hybrid machine-learning model. The hybrid machine-learning model can further be used to update the process model. The updated process model is used in conjunction with monitoring meltpool measurements (such as energy densities, temperatures and melt-pool dimensions) for any departure from the expected relationship to detect anomalies. The technique can also be used to take corrective actions through closed-loop control in the same or subsequent layers.

The embodiments disclosed herein significantly expand the applicability of anomaly detection to low/moderate volume parts that are built for the first time or built under new setup/conditions. In-situ quality assurance (QA) leads to reduced cost and improved quality. This adds a new capability to do volumetric inspection in situ while printing.

In the present disclosure, the term "additive manufacture" (or AM) may refer to processes of generating an object in a progressive, e.g., layer-by-layer fashion. Examples of AM to which this disclosure pertains include: DMLM, directed energy deposition, and power bed fusion.

In the present disclosure, the term "meltpool monitoring" may refer to processes of making measurements (or "taking readings") with respect to an ongoing AM process. Examples of aspects of the AM process that may be measured during meltpool monitoring include the dimensions (e.g., length, width, and depth) of metal, state of metal (e.g., molten metal, solid metal, and powdered metal), temperature (or other measurements that may be indicative of temperature, e.g., reflected energy), depth and/or density of the powder bed at various locations, (e.g., a depth map of the powder bed and/or a density map of the powder map), a degree of vibration of the recoater during travel, acoustic emissions during laser exposure, a degree of humidity, and measurements of electromagnetic field. The temperature measurements may include thermal images. Additionally, optical images may be obtained.

In the present disclosure, the term "anomalies" may refer to deviances from normal or expected operation or structure. Examples of anomalies include a portion of an object having too high a temperature (compared with an expected temperature) or a portion of an object having too low a temperature (compared with an expected temperature). Anomalies may include and/or be indicative of defects in an object.

FIG. 1 is a functional block diagram illustrating an example system 100 according to one or more embodiments. System 100 (and/or one or more elements thereof) may be configured to generate an object 110 according to a build file 102. Further, system 100, may be configured to generate object 110 with higher quality and/or fewer defects than another AM system. In particular, because system 100 may employ one or more techniques disclosed herein, system 100 may represent improvements over other AM systems.

Build file 102 may be a digital model of an object and/or include instructions (e.g., layer-by-layer instructions) for additively manufacturing the object. Build files 102 may include laser settings and/or hatch patterns. In the art, build file 102 may alternatively be referred to as a "design" or "slice file."

System 100 includes an object generator 104, which may be configured to generate object 110 through AM according to build file 102. For example, object generator 104 may include a laser configured to melt metal powder into successive layers of object 110.

Object generator 104 may include a controller 106 configured to control operation of the object generator 104 e.g., according to build file 102 and/or instructions 120. Controller 106 may be, or include, any suitable computing system, e.g., controller 106 may be, or include, one or more devices 700 of FIG. 7 and/or one or more elements thereof.

Object generator 104 may include sensors 108, which may be configured to take readings 112 relative to the generation of object 110. Readings 112 may include information relative to a build set up, an environment within object generator 104 (including e.g., chamber conditions such as gases in the chamber, flow of gas in the chamber, gas pressure in the chamber, and/or temperature in the chamber), and/or the process (including e.g., data relative to emitted intensity, scaled temperature, emissive power, energy density, and/or variances of emissive power, energy density, emitted intensity or scaled temperature). For example, sensors 108 may include a thermal imaging device and readings 112 may include one or more thermal images with a resolution of, for example, 1 pixel per 0.01 square millimeters on the build plate. In some embodiments, the thermal imaging device may include a photodiode that scans with the laser and measures reflected energy. Additionally, sensors 108 may include an optical imaging device. Readings 112 may include a layer-by-layer history of the generation of object 110.

Object 110 may be any object capable of being generated through AM. In the art, an object may alternatively be referred to as a part.

System 100 includes a simulator 114, which may be configured to generate process model 116 based on build file 102. Simulator 114 may be, or include, any suitable computing system, e.g., simulator 114 may be, or include, one or more devices 700 of FIG. 7 and/or one or more elements thereof.

Process model 116 may include a model of an object (e.g., the object of build file 102) including, e.g., layer-by-layer information regarding the object and/or the process of generating the object. For example, process model 116 may include temperature and/or meltpool characteristics (including e.g., length, width, and/or depth of melting or pooling matter) for each layer of object 110. Process model 116 may include a physics-based simulation of the object. In the art, process model 116 may alternatively be referred to as a "digital twin."

System 100 may include hybrid machine-learning model 118, which may be configured to generate instructions 120 for generating object 110 through AM. Hybrid machine-learning model 118 may include any suitable machine-learning model including, as examples, a neural network, a decision tree, Gaussian processes, Markov-chain Monte-Carlo algorithms, Bayesian calibration methods, and a support vector machine. Hybrid machine-learning model 118 may be, include, or be implemented using any suitable computing system, e.g., hybrid machine-learning model 118 may be, include, or be implemented using one or more devices 700 of FIG. 7 and/or one or more elements thereof.

Hybrid machine-learning model 118 may have been trained using training data 124. Training data 124 may include simulated data and measured data. In particular, hybrid machine-learning model 118 may be trained using simulated data (e.g., other process models based on other build files) and measured data (e.g., including other readings resulting from other objects being generated). The simulated data of training data 124 may include process models based on multiple build files including build files that are similar to build file 102 and build files that are dissimilar to build file 102. The measured data of training data 124 may include readings from multiple objects being generated. The multiple objects may include objects similar to object 110 and objects dissimilar to object 110. The hybrid machine-learning model may account for unmodelled effects as well as transformation from "actual" to "relative" temperature.

In some embodiments, hybrid machine-learning model 118 may be configured to generate instructions 120. In some embodiments, the instructions 120 may be based on what the hybrid machine-learning model has "learned" through training (e.g., relationships between inputs and outputs). Additionally or alternatively, the instructions 120 may be based on process model 116 e.g., instructions 120 may be based on how relationships observed during training apply to process model 116.

The process model 116 (or the updated process model 122, which is described below) and the hybrid machine-learning model 118 together may include a "digital twin." The digital twin may be, or may include, a representation of a process on a machine (e.g., not a family of processes and/or machines). In practice, two identical machines (i.e., having the same model number from the same vendor) may still have unique digital twins because there may be minor differences in how the two machines behave. For example, a first hybrid machine-learning model 118 and a first updated process model 122 for a first machine may be different from a second hybrid machine-learning model 118 and a second updated process model 122 for a second machine.

In these or other embodiments, instructions 120 may include thresholds for the generation of object 110. In particular, instructions 120 may include thresholds indicative of anomalies or normal or abnormal operating conditions during generation of object 110 through AM. For example, instructions 120 may include suitable temperature ranges (or energy density readings) for locations of layers of object 110. Further, in these or other embodiments, instructions 120 may include directions regarding what object generator 104 should do in response to a reading 112 that indicates a crossed threshold. Examples of such directions include changing a power of the laser, changing a scan speed, scan interval time, and/or scan strategy of the laser, changing a gas-flow speed, changing a thickness of one or more subsequent layers, changing a recoating direction (e.g., unidirectional or bi-directional), changing a focus of the laser, and/or changing a hatch pattern and/or hatch distance.

In some embodiments, hybrid machine-learning model 118 may be configured to provide instructions 120 including thresholds and directions regarding what object generator 104 should do in response to a reading 112 that indicates a crossed threshold and controller 106 may be configured to control AM according to instructions 120. In other embodiments, object generator 104 may be configured to provide readings 112 to hybrid machine-learning model 118 and hybrid machine-learning model 118 may be configured to provide instructions 120 (including directions) based on readings 112 and controller 106 may be configured to control AM according to the directions. Instructions 120, including thresholds and directions, may include thresholds for anomaly detection and directions for responses to detected anomalies.

Hybrid machine-learning model 118 may be configured to generate and provide instructions 120 before generation of object 110 begins. Hybrid machine-learning model 118 may be configured to account for part geometry effects for first-part qualification (FPQ), build-strategy, and build parameter effects and may base instructions 120 at least in part thereon. Thus, when object 110 is generated according to instructions 120, object 110 may have higher quality than another object generated without taking the previously-mentioned factors into consideration. Further, when object 110 is generated according to instructions 120, the generation may be directed by thresholds indicating anomalies and directions for what to do in response to detected anomaly.

System 100 may be configured to generate object 110 using a real-time (or near-real-time) feedback control. For example, system 100 may be configured to begin generating object 110 according to build file 102. While generating object 110, object generator 104 may take readings 112 and provide readings 112 to hybrid machine-learning model 118 (which was previously trained using training data 124, including simulated data and measured data). Hybrid machine-learning model 118 may obtain process model 116 (which was generated according to build file 102). Hybrid machine-learning model 118 may then generate updated instructions 120 based on process model 116 and readings 112. Object generator 104 may then continue the generation of object 110, however, in the continued generation, object generator 104 may generate object 110 according to the updated instructions 120.

Additionally or alternatively, in some embodiments, hybrid machine-learning model 118 may be configured to generate updated process model 122 based on process model 116 and readings 112. Updated process model 122 may be substantially similar to process model 116, however, updated process model 122 may include one or more changes responsive to readings 112, which are received in response to an ongoing generation of object 110 through AM. Thus, updated process model 122 may more accurately reflect object 110 as it is being generated than process model 116. For example, object generator 104, while generating object 110 according to build file 102 may take readings 112. Object generator 104 may provide readings 112 to hybrid machine-learning model 118. Additionally, simulator 114 may be configured to generate process model 116 according to build file 102 and to provide process model 116 to hybrid machine-learning model 118. Hybrid machine-learning model 118 may be configured to update process model 116 according to readings 112 to generate updated process model 122. Thereafter, hybrid machine-learning model 118 may be configured to update instructions 120 based on readings 112 and updated process model 122 (instead of process model 116). Further, object generator 104 may be configured to generate object 110 according to the updated instructions 120 (e.g., continuing the generation of object 110 according to the updated instructions 120).

Because of the feedback control, system 100 may be configured to generate object 110 more accurately (according to build file 102), with fewer defects, and/or with better qualities (e.g., structural integrity). As another example, readings 112 may indicate a potential defect in a layer of object 110 as object 110 is being generated. Potential defects may include, as examples, a pocket or metal powder that should have been melted that did not reach a temperature sufficient to melt the metal powder or a location of object 110 that has a temperature that is too high a lack of horizontal fusion, a lack of vertical fusion, keyholing, balling, gas porosity, improper welding, delamination, incorrect energy, residual stresses, shrink lines, stitch-line porosity, and surface-close porosity. System 100 may be configured to correct the defect while generating a subsequent layer of the object. For example, instructions 120 may be adjusted to provide more or less energy at a location of a defect to correct the defect.

Additionally or alternatively, system 100 may be configured to experimentally generate of one or more layers of an instance of object 110 to train hybrid machine-learning model 118 and/or to update updated process model 122. For example, one or more layers of an instance of object 110 may be generated using simple geometries and/or simple hatches (e.g., only volume hatches). Readings 112 taken during generation of the one or more layers may be used to train hybrid machine-learning model 118 and/or to update updated process model 122. For example, the experimental generation may include single-layer experiments to obtain data (e.g., meltpool length, width, and/or depth and temperature data) for updating updated process model 122. The experimental generation may further include multi-layer experiments to further improve the updated process model 122. Examples of aspects of the updated process model 122 that may be updated include powder absorptivity, solid absorptivity, thermal-expansion coefficients. Following the experimental generation, one or more instances of object 110 may be generated. The instances of object 110 generated following the experimental generation may benefit from the training hybrid machine-learning model 118 received during the experimental generation and/or from the updating updated process model 122 received during the experimental generation.

Figure 2:
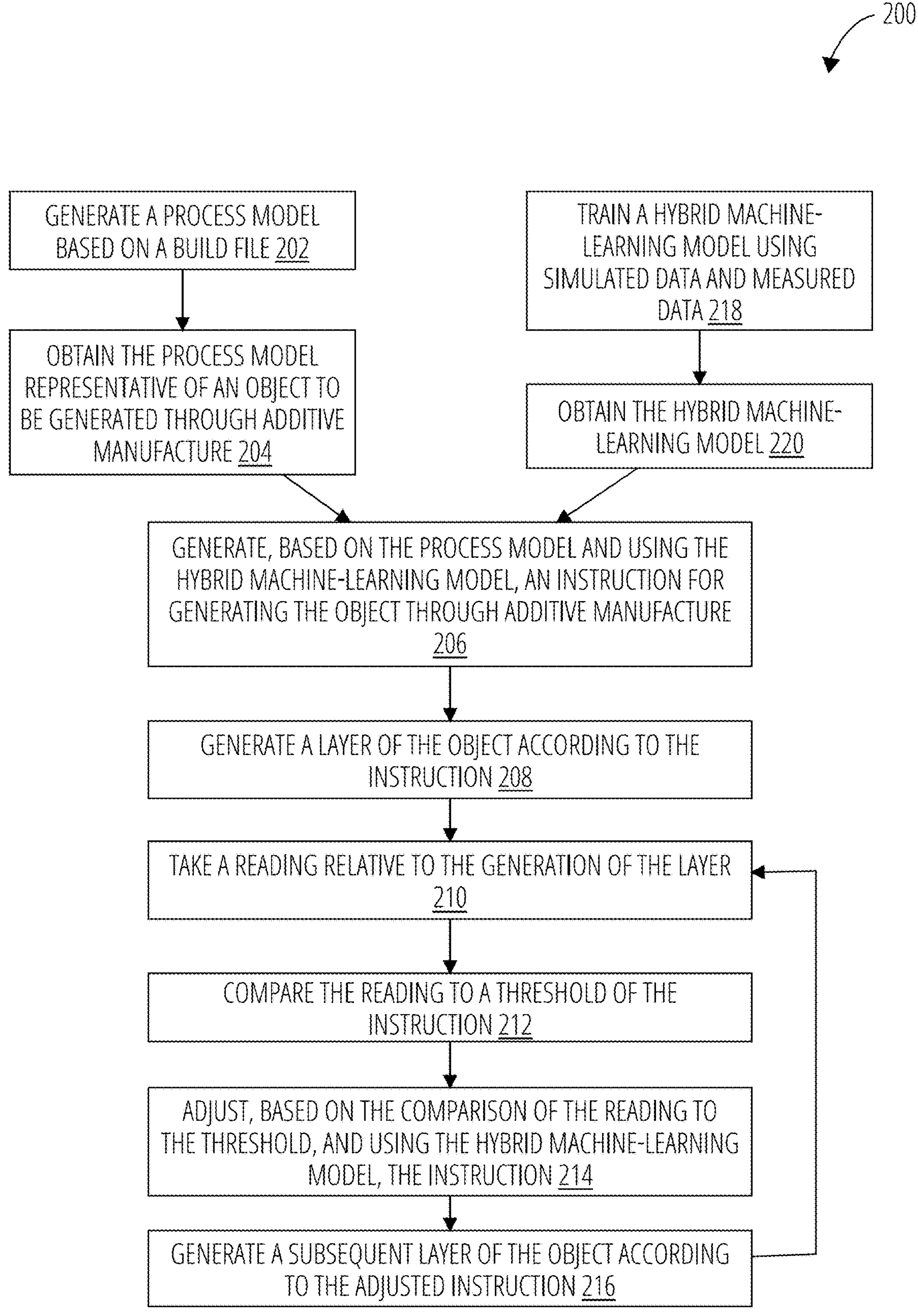
FIG. 2 is a flowchart of an example method, according to one or more embodiments.

FIG. 2 is a flowchart of an example method 200, according to one or more embodiments. At least a portion of method 200 may be performed, in some embodiments, by a device or system, such as system 100 of FIG. 1, or another device or system. Although illustrated as discrete blocks, various blocks may be divided into additional blocks, combined into fewer blocks, or eliminated, depending on the desired implementation.

At block 202, a process model may be generated based on a build file. Process model 116 of FIG. 1 may be an example of the process model of method 200. Build file 102 of FIG. 1 may be an example of the build file of method 200.

At block 204, the process model may be obtained. The process model may be representative of an object to be generated through additive manufacture. Object 110 of FIG. 1 may be an example of the object of method 200.

At block 218, a hybrid machine-learning model may be trained using simulated data and measured data. Hybrid machine-learning model 118 of FIG. 1 may be an example of the hybrid machine-learning model of method 200. Training data 124 of FIG. 1 may be an example of the simulated data and measured data of method 200.

At block 220, the hybrid machine-learning model may be obtained.

At block 206, an instruction for generating the object through additive manufacture may be generated based on the process model and using the hybrid machine-learning model. Instructions 120 of FIG. 1 may be an example of the instruction of method 200.

At block 208, a layer of the object may be generated. In some embodiments, the layer may be generated according to the instruction. As an example, object generator 104 of FIG. 1 may generate the object.

At block 210, a reading relative to the generation of the object may be taken. Readings 112 of FIG. 1 may be an example of the reading of method 200.

At block 212, the reading may be compared with a threshold of the instruction.

At block 214, the instruction may be adjusted based on the comparison of the reading to the threshold. For example, a direction of the instruction may be adjusted. Instructions 120 of FIG. 1 may be an example of the adjusted instruction of method 200. In some embodiments, adjusting the instruction based on the comparison may include adjusting directions for how a subsequent layer is to be generated as a result of a crossed threshold. In some embodiments, the instruction may be adjusted using the hybrid machine-learning model.

At block 216, a subsequent layer of the object may be generated according to the adjusted instruction.

In some cases, block 216 may be followed by block 210, at which a reading relative to the generation of the subsequent layer may be taken. In such cases, block 210 may be followed by block 212, at which the reading may be compared to a threshold of the adjusted instruction and by block 214 at which the adjusted instruction may be further adjusted.

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, block 202, and/or block 218 may be omitted or have been performed previously. As another example, block 208 though block 216 may be omitted.

Figure 3:
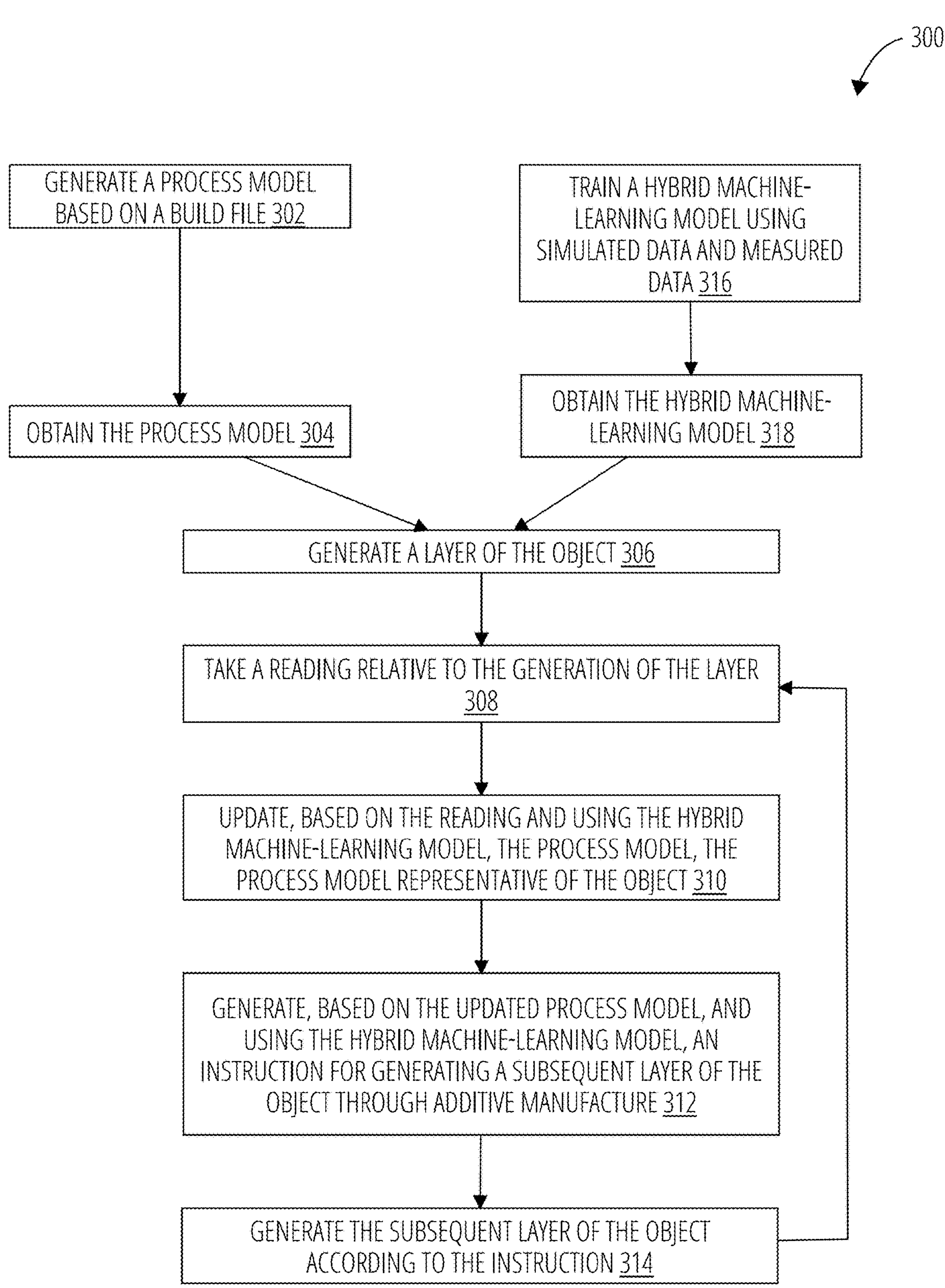
FIG. 3 is a flowchart of another example method, according to one or more embodiments.

FIG. 3 is a flowchart of an example another method 300, according to one or more embodiments. At least a portion of method 300 may be performed, in some embodiments, by a device or system, such as system 100 of FIG. 1, or another device or system. Although illustrated as discrete blocks, various blocks may be divided into additional blocks, combined into fewer blocks, or eliminated, depending on the desired implementation.

At block 302, a process model may be generated based on a build file. Process model 116 of FIG. 1 may be an example of the process model of method 300. Build file 102 of FIG. 1 may be an example of the build file of method 300.

At block 304, the process model may be obtained.

At block 316, a hybrid machine-learning model may be trained using simulated data and measured data. Hybrid machine-learning model 118 of FIG. 1 may be an example of the hybrid machine-learning model of method 300. Training data 124 of FIG. 1 may be an example of the simulated data and measured data of method 300.

At block 318, the hybrid machine-learning model may be obtained.

At block 306, a layer of the object may be generated. Object 110 of FIG. 1 may be an example of the object of method 300. As an example, object generator 104 of FIG. 1 may generate the object.

At block 308, a reading relative to the generation of the object may be taken. Readings 112 of FIG. 1 may be an example of the reading of method 200.

At block 310, the process model may be updated based on the reading and using the hybrid machine-learning model. The process model may be representative of an object to be generated through additive manufacture.

At block 312, an instruction for generating a subsequent layer of the object through additive manufacture may be generated based on the updated process model and using the hybrid machine-learning model.

At block 314, a subsequent layer of the object may be generated according to the instruction.

In some cases, block 314 may be followed by block 308, at which a reading relative to the generation of the subsequent layer may be taken. In such cases, block 308 may be followed by block 310 at which the updated process model may be further updated and by block 312 at which the updated instruction may be further updated.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, block 302, and/or block 316 may be omitted or have been performed previously.

Figure 4:
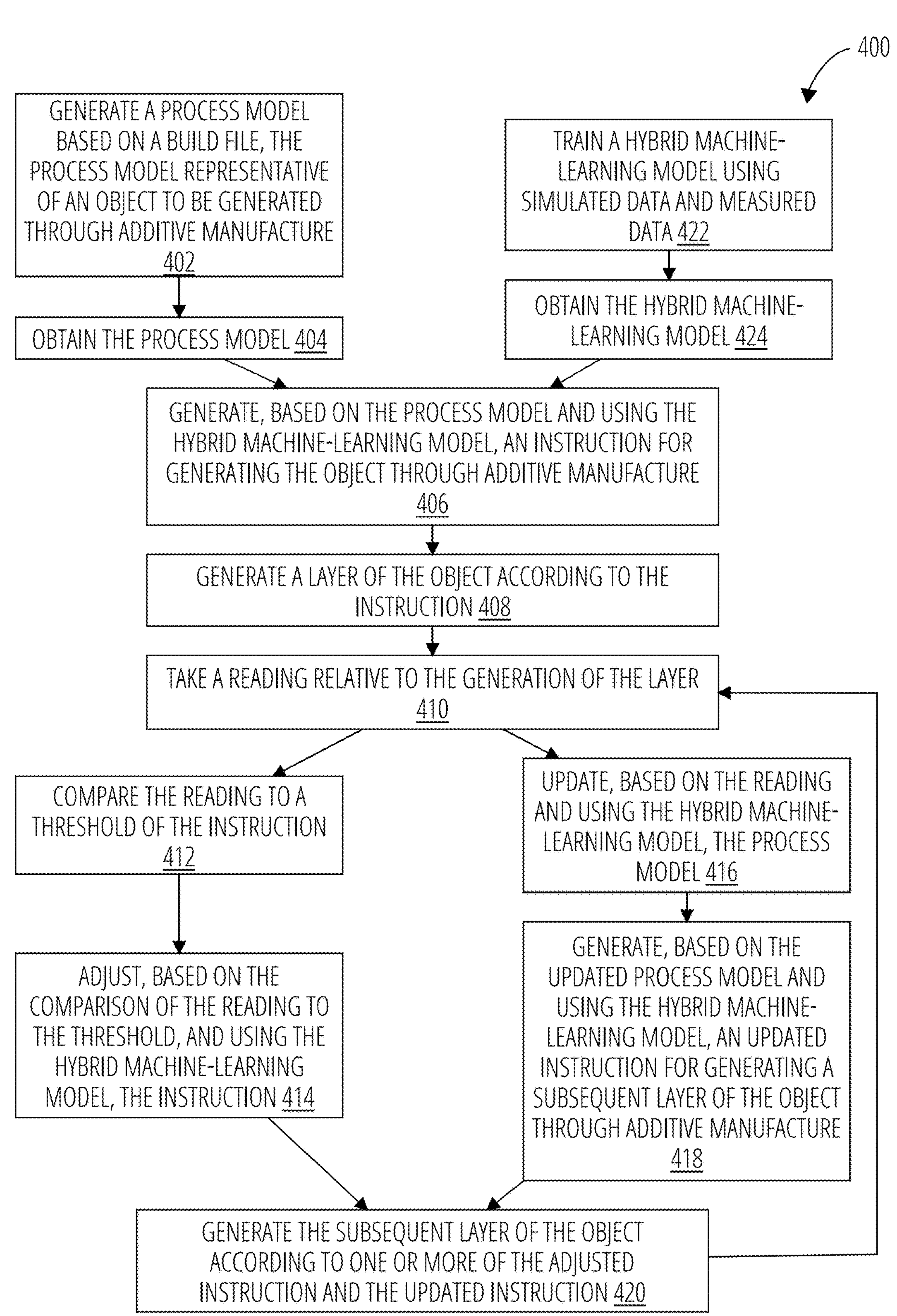
FIG. 4 is a flowchart of yet another example method, according to one or more embodiments.

FIG. 4 is a flowchart of an example yet another method 400, according to one or more embodiments. At least a portion of method 400 may be performed, in some embodiments, by a device or system, such as system 100 of FIG. 1, or another device or system. Although illustrated as discrete blocks, various blocks may be divided into additional blocks, combined into fewer blocks, or eliminated, depending on the desired implementation.

At block 402, a process model may be generated based on a build file. The process model may be representative of an object to be generated through additive manufacture. Process model 116 of FIG. 1 may be an example of the process model of method 400. Build file 102 of FIG. 1 may be an example of the build file of method 400. Object 110 of FIG. 1 may be an example of the object of method 400.

At block 404, the process model may be obtained.

At block 422, a hybrid machine-learning model may be trained using simulated data and measured data. Hybrid machine-learning model 118 of FIG. 1 may be an example of the hybrid machine-learning model of method 400. Training data 124 of FIG. 1 may be an example of the simulated data and measured data of method 400.

At block 424, the hybrid machine-learning model may be obtained.

At block 406, an instruction for generating the object through additive manufacture may be generated based on the process model and using the hybrid machine-learning model. Instructions 120 of FIG. 1 may be an example of the instruction of method 400.

At block 408, a layer of the object may be generated. In some embodiments, the layer may be generated according to the instruction. As an example, object generator 104 of FIG. 1 may generate the object.

At block 410, a reading relative to the generation of the object may be taken. Readings 112 of FIG. 1 may be an example of the reading of method 400.

At block 412, the reading may be compared with a threshold of the instruction.

At block 414, the instruction may be adjusted based on the comparison of the reading to the threshold. For example, a direction of the instruction may be adjusted. Instructions 120 of FIG. 1 may be an example of the adjusted instruction of method 400. In some embodiments, adjusting the instruction based on the comparison may include adjusting directions for how a subsequent layer is to be generated as a result of a crossed threshold. In some embodiments, the instruction may be adjusted by the hybrid machine-learning model.

At block 416, the process model may be updated based on the reading and using the hybrid machine-learning model.

At block 418, an instruction for generating a subsequent layer of the object through additive manufacture may be generated based on the updated process model and using the hybrid machine-learning model.

At block 420, the subsequent layer of the object may be generated according to one or more of the adjusted instruction and the updated instruction.

In some cases, block 420 may be followed by block 410, at which a reading relative to the generation of the subsequent layer may be taken. In such cases, block 410 may be followed by block 412, at which the reading may be compared to a threshold of the adjusted instruction and by block 414 at which the adjusted instruction may be further adjusted. Additionally, in such cases, block 410 may be followed by block 416 at which the updated process model may be further updated and by block 418 at which the updated instruction may be further updated.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, block 402, and/or block 422 may be omitted or have been performed previously. As another example, block 412 and block 414 or block 416 and block 418 may be omitted. Alternatively, in some embodiments, block 412, block 414, block 416, and block 418 may be combined into a single block at which the process model is updated and instructions are updated and/or adjusted based on: the comparison of the reading to the threshold and the updated process model. The single block may include comparing the reading to a threshold and using the hybrid machine-learning model and updated process model to adjust/generate an instruction.

Figure 5:
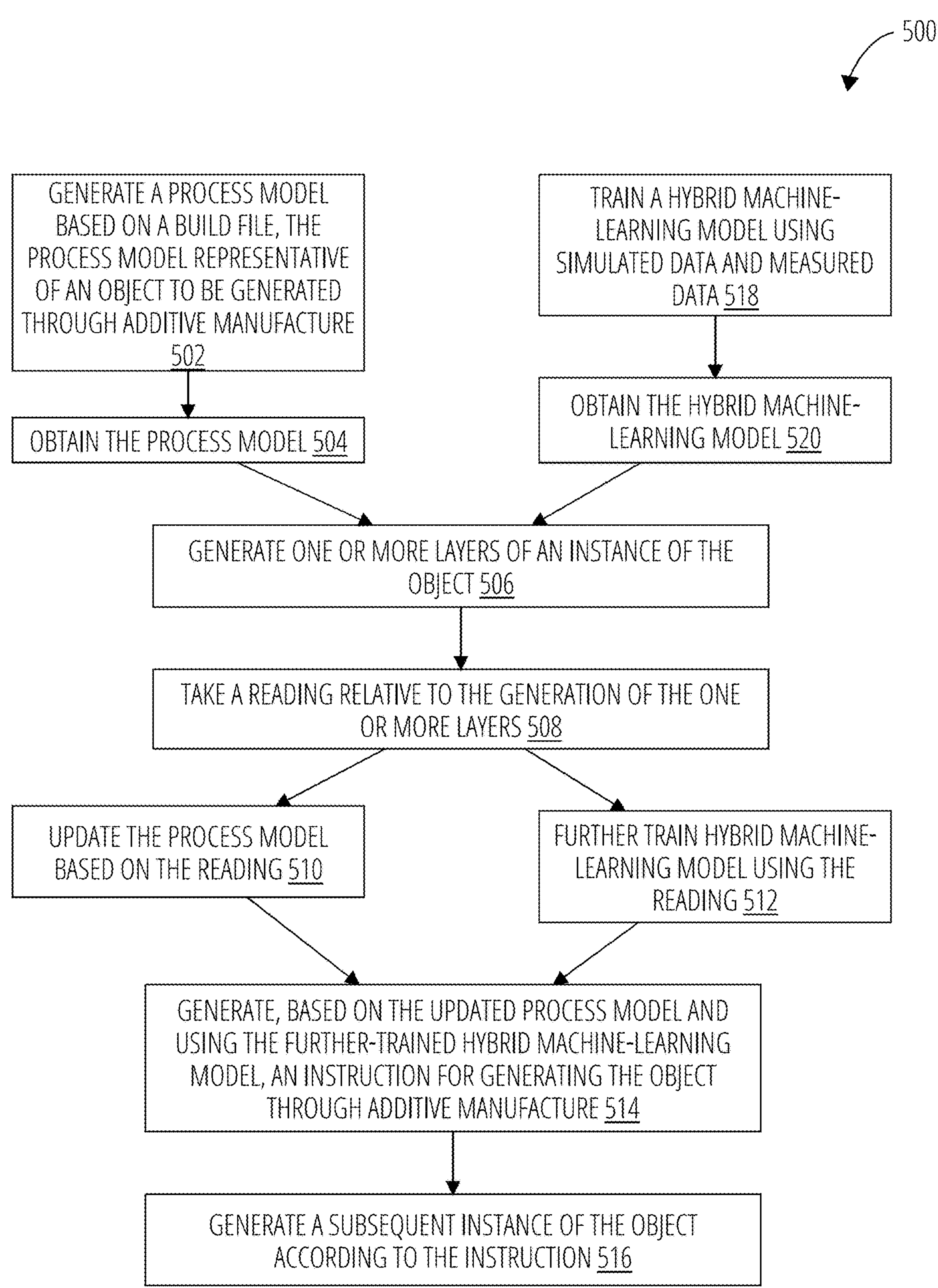
FIG. 5 is a flowchart of yet another example method, according to one or more embodiments.

FIG. 5 is a flowchart of an example yet another method 500, according to one or more embodiments. At least a portion of method 500 may be performed, in some embodiments, by a device or system, such as system 100 of FIG. 1, or another device or system. Although illustrated as discrete blocks, various blocks may be divided into additional blocks, combined into fewer blocks, or eliminated, depending on the desired implementation.

At block 502, a process model may be generated based on a build file. The process model may be representative of an object to be generated through additive manufacture. Process model 116 of FIG. 1 may be an example of the process model of method 500. Build file 102 of FIG. 1 may be an example of the build file of method 500. Object 110 of FIG. 1 may be an example of the object of method 500.

At block 504, the process model may be obtained.

At block 518, a hybrid machine-learning model may be trained using simulated data and measured data. Hybrid machine-learning model 118 of FIG. 1 may be an example of the hybrid machine-learning model of method 500. Training data 124 of FIG. 1 may be an example of the simulated data and measured data of method 500.

At block 520, the hybrid machine-learning model may be obtained.

At block 506, one or more layers of an instance of an object may be generated. As an example, object generator 104 of FIG. 1 may generate the one or more layers.

At block 508, a reading relative to the generation of the one or more layers may be taken. Readings 112 of FIG. 1 may be an example of the reading of method 500.

At block 510, the process model may be updated based on the reading.

At block 512, the hybrid machine-learning model may be further trained using the reading.

At block 514, an instruction for generating the object through additive manufacture may be generated based on the updated process model and using the further-trained hybrid machine-learning model.

At block 516, a subsequent instance of the object may be generated according to the instruction.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, block 502, and/or block 518 may be omitted or have been performed previously. As another example, block 510 or block 512 may be omitted. Alternatively, in some embodiments, block 510 and block 512 may be combined into a single block at which the process model is updated and the hybrid machine-learning model is further trained.

Figure 6:
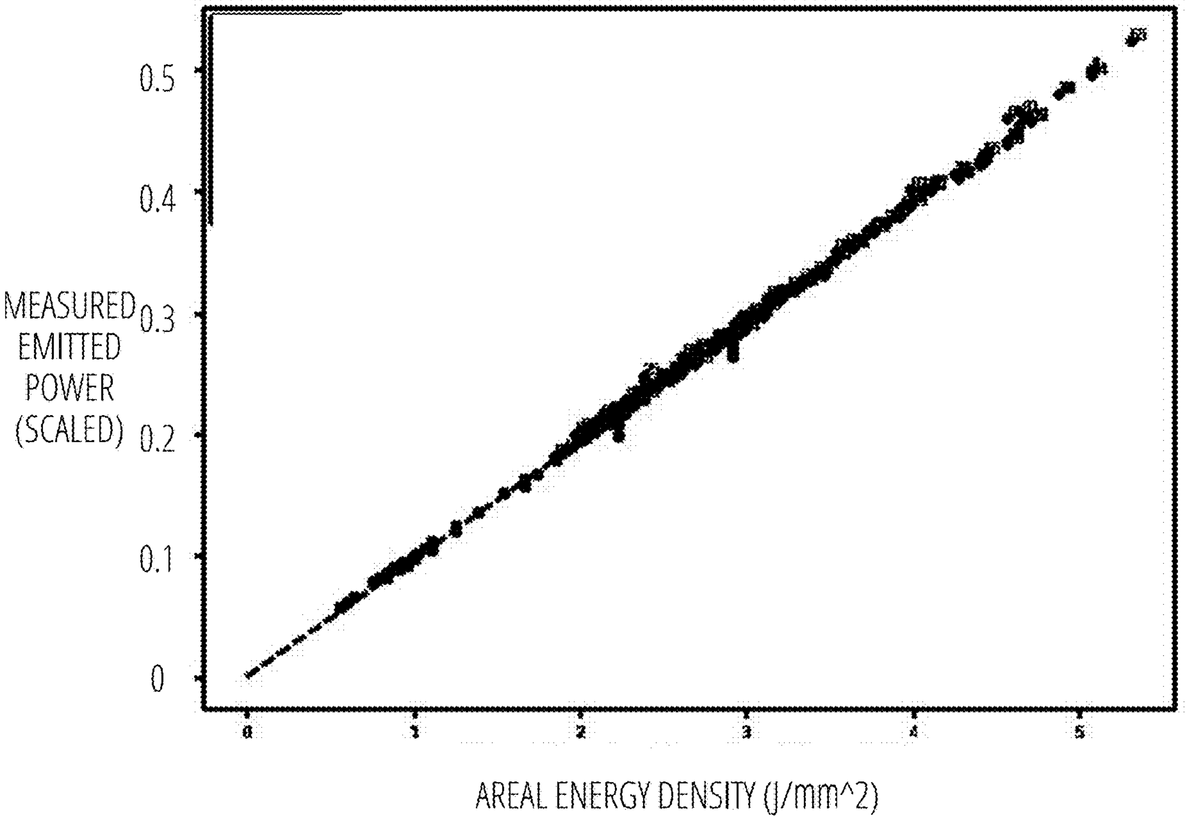
FIG. 6 is a graph illustrating a relationship, according to one or more embodiments.

FIG. 6 is a graph illustrating a relationship, according to one or more embodiments. In particular, FIG. 6 is a graph showing a correlation between input areal energy density (AED) and emitted power according to one or more embodiments.

As can be seen from the graph, AED and emitted power are correlated. The data for data plot is from multiple experiments using multiple layer heights, laser powers, scan speeds, and laser focuses. For example, the data for data plot includes data from a first build including density cubes, data from a second build including density cubes and a third build including a complex part with various regions such as down skin, up skin, and core.

Correlations such as the correlation illustrated in FIG. 6 can be leveraged by a hybrid machine-learning model (e.g., hybrid machine-learning model 118 of FIG. 1) in generating instructions for generation of an object. For example, before a build, a hybrid-machine learning model (e.g., hybrid machine-learning model 118 of FIG. 1) may be trained using data that exhibits the relationship illustrated in FIG. 6. The hybrid machine-learning model may generate instructions (e.g., instructions 120) including thresholds based, at least in part, on the relationship. During a build, a reading (e.g., readings 112 of FIG. 1) may be indicative of energy density (which may correlate to measured emitted power as illustrated in FIG. 6). The energy density of the reading may be compared with the threshold of the instructions (which are based, at least in part, on the relationship). If the energy density of the reading does not satisfy the threshold, adjustments may be made to the generation of subsequent layers to compensate for the readings that do not satisfy the threshold. For example, in some embodiments, the instructions (which are based at least in part on the relationship) may include directions for altering the subsequent layer to compensate for or correct an anomaly that was indicated by the readings that did not satisfy the threshold. In these or other embodiments, the hybrid machine-learning model may be used to generate new directions (which are based at least in part on the relationship) for the subsequent layer.

The example relationship illustrated with regard to FIG. 6 is simple and linearly correlates one input with one output. This example relationship was selected for descriptive purposes. The hybrid machine-learning model may include and/or use several kinds of constitutive models with complex relationships (e.g., not just linear) between multiple inputs and multiple outputs simultaneously (where inputs are parameters that can be controlled according to the instructions and outputs are the potential measurements that have previously been listed).

Figure 7:
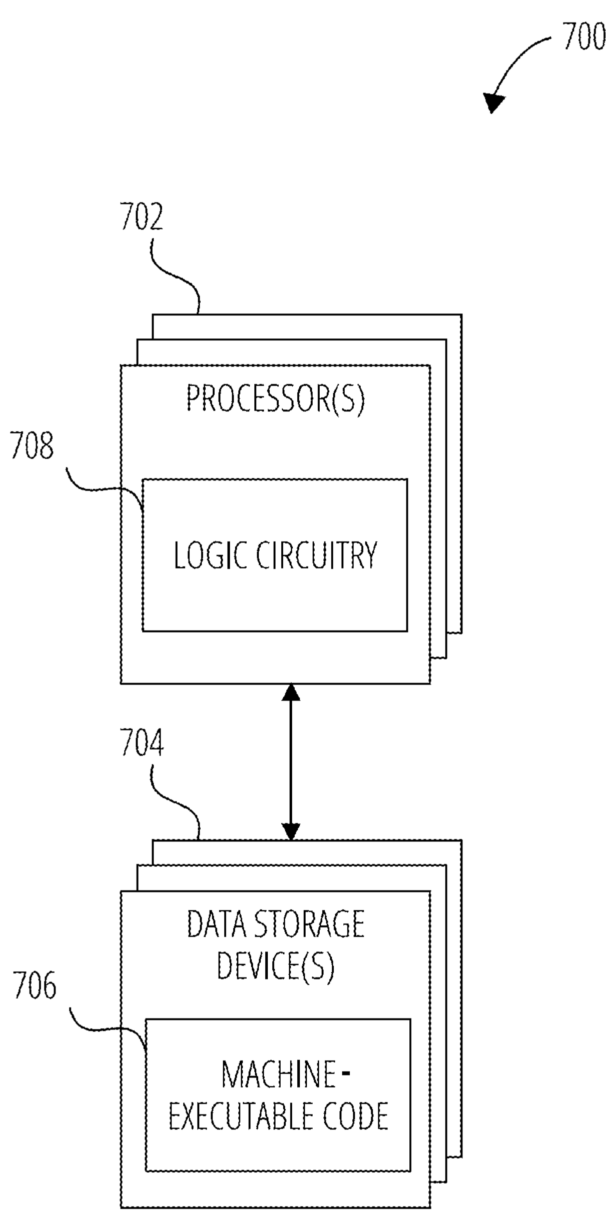
FIG. 7 illustrates a block diagram of an example device that may be used to implement various functions, operations, acts, processes, and/or methods, in accordance with one or more embodiments.

FIG. 7 is a block diagram of an example device 700 that, in some embodiments, may be used to implement various functions, operations, acts, processes, and/or methods disclosed herein. The device 700 includes one or more processors 702 (sometimes referred to herein as "processors 702") operably coupled to one or more apparatuses such as data storage devices (sometimes referred to herein as "storage 704"). The storage 704 includes machine-executable code 706 stored thereon (e.g., stored on a computer-readable memory) and the processors 702 include logic circuitry 708. The machine-executable code 706 include information describing functional elements that may be implemented by (e.g., performed by) the logic circuitry 708. The logic circuitry 708 is adapted to implement (e.g., perform) the functional elements described by the machine-executable code 706. The device 700, when executing the functional elements described by the machine-executable code 706, should be considered as special purpose hardware configured for carrying out functional elements disclosed herein. In some embodiments, the processors 702 may be configured to perform the functional elements described by the machine-executable code 706 sequentially, concurrently (e.g., on one or more different hardware platforms), or in one or more parallel process streams.

When implemented by logic circuitry 708 of the processors 702, the machine-executable code 706 is configured to adapt the processors 702 to perform operations of embodiments disclosed herein. For example, the machine-executable code 706 may be configured to adapt the processors 702 to perform at least a portion or a totality of the method 200 of FIG. 2, method 300 of FIG. 3, method 400 of FIG. 4, or method 500 of FIG. 5. As another example, the machine-executable code 706 may be configured to adapt the processors 702 to perform at least a portion or a totality of the operations discussed with relation to system 100 of FIG. 1, and more specifically, one or more of the controller 106 of FIG. 1, simulator 114 of FIG. 1, and/or hybrid machine-learning model 118 of FIG. 1. As an example, the computer-readable instructions may be configured to instruct the processors 702 to perform at least some functions of controller 106 of FIG. 1, simulator 114 of FIG. 1, and/or hybrid machine-learning model 118 of FIG. 1, as discussed herein.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some embodiments, the storage 704 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 702 and the storage 704 may be implemented into a single device (e.g., a semiconductor device product, a system on chip (SOC), etc.). In some embodiments the processors 702 and the storage 704 may be implemented into separate devices.

In some embodiments, the machine-executable code 706 may include computer-readable instructions (e.g., software code, firmware code). By way of example, the computer-readable instructions may be stored by the storage 704, accessed directly by the processors 702, and executed by the processors 702 using at least the logic circuitry 708. Also by way of example, the computer-readable instructions may be stored on the storage 704, transmitted to a memory device (not shown) for execution, and executed by the processors 702 using at least the logic circuitry 708. Accordingly, in some embodiments the logic circuitry 708 includes electrically configurable logic circuitry.

In some embodiments, the machine-executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used. By way of examples, Verilog™, System Verilog™ or very large scale integration (VLSI) hardware description language (VHDL™) may be used.

HDL descriptions may be converted into descriptions at any of numerous other levels of abstraction as desired. As an example, a high-level description can be converted to a logic-level description such as a register-transfer language (RTL), a gate-level (GL) description, a layout-level description, or a mask-level description. As an example, micro-operations to be performed by hardware logic circuits (e.g., gates, flip-flops, registers) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 706 may include an HDL, an RTL, a GL description, a mask level description, other hardware description, or any combination thereof.

In embodiments where the machine-executable code 706 includes a hardware description (at any level of abstraction), a system (not shown, but including the storage 704) may be configured to implement the hardware description described by the machine-executable code 706. By way of example, the processors 702 may include a programmable logic device (e.g., an FPGA or a PLC) and the logic circuitry 708 may be electrically controlled to implement circuitry corresponding to the hardware description into the logic circuitry 708. Also by way of example, the logic circuitry 708 may include hard-wired logic manufactured by a manufacturing system (not shown, but including the storage 704) according to the hardware description of the machine-executable code 706.

Regardless of whether the machine-executable code 706 includes computer-readable instructions or a hardware description, the logic circuitry 708 is adapted to perform the functional elements described by the machine-executable code 706 when implementing the functional elements of the machine-executable code 706. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure may include:

Embodiment 1: A method comprising: obtaining a process model representative of an object to be generated through additive manufacture and generating, based on the process model and using a hybrid machine-learning model, an instruction for generating the object through additive manufacture.

Embodiment 2: The method of embodiment 1, wherein the hybrid machine-learning model was trained using simulated data and measured data.

Embodiment 3: The method of embodiment 1, further comprising training the hybrid machine-learning model using simulated data and measured data.

Embodiment 4: The method of embodiment 1, further comprising generating the process model based on a build file.

Embodiment 5: The method of embodiment 1, wherein the instruction comprises a threshold for additive manufacture.

Embodiment 6: The method of embodiment 5, wherein the instruction further comprises an adjustment for additive manufacture responsive to a crossing of the threshold.

Embodiment 7: The method of embodiment 1, further comprising generating the object through additive manufacture according to the instruction.

Embodiment 8: The method of embodiment 7, wherein generating the object through additive manufacture according to the instruction comprises: generating a layer of the object; taking a reading relative to the generation of the layer; comparing the reading to a threshold of the instruction; adjusting, based on the comparison of the reading to the threshold, and using the hybrid machine-learning model, the instruction; and generating a subsequent layer of the object according to the adjusted instruction.

Embodiment 9: The method of embodiment 8, wherein the reading is indicative of a temperature at a location of the layer and the adjusted instruction includes information related to operation of an energy source configured to provide energy for additive manufacture.

Embodiment 10: The method of embodiment 8, wherein the reading is indicative of one or more of: emissive power, energy density, intensity, scaled temperature, powder-bed depth, powder-bed density, a degree of vibration of a recoater, acoustic emissions, a degree of humidity, and a strength of an electromagnetic field at one or more locations of the layer and the adjusted instruction includes information related to one or more of: gas-flow speed, recoating direction, laser power, laser focus, scan speed, scan pattern, scan strategy, scan interval time, layer thickness, hatch spacing, and hatch distance.

Embodiment 11: The method of embodiment 8, wherein the reading is indicative of a defect in the layer and the adjusted instruction includes information related to the defect.

Embodiment 12: The method of embodiment 11, wherein the adjusted instruction includes information for correcting the defect while generating the subsequent layer.

Embodiment 13: The method of embodiment 12, wherein generating the object through additive manufacture according to the instruction further comprises correcting the defect while generating the subsequent layer of the object according to the adjusted instruction.

Embodiment 14: A method comprising: generating a layer of an object; taking a reading relative to the generation of the layer; updating, based on the reading and using a hybrid machine-learning model, a process model representative of the object; and generating, based on the updated process model and using the hybrid machine-learning model, an instruction for generating a subsequent layer of the object through additive manufacture.

Embodiment 15: The method of embodiment 14, wherein the hybrid machine-learning model was trained using simulated data and measured data.

Embodiment 16: The method of embodiment 14, further comprising, prior to updating the process model, generating the process model based on a build file.

Embodiment 17: The method of embodiment 14, further comprising generating the subsequent layer of the object according to the instruction.

Embodiment 18: A system for additive manufacture, the system comprising: a simulator configured to generate a process model according to a build file, the process model representative of an object to be generated through additive manufacture; a hybrid machine-learning model trained using simulated data and measured data, the hybrid machine-learning model configured to generate, based on the process model, an instruction for generating the object; and an object generator configured to generate an object through additive manufacture according to a build file and the instruction.

Embodiment 19: The system of embodiment 18, wherein the object generator is further configured to take a reading relative to generation of a layer of the object; wherein the hybrid machine-learning model is further configured to update the process model based on the reading; and wherein the hybrid machine-learning model is further configured to generate an updated instruction based on the updated process model.

Embodiment 20: The system of embodiment 18, wherein the object generator is further configured to take a reading relative to the generation of the object; and wherein the hybrid machine-learning model is configured to generate the instruction further based on the reading.

Embodiment 21: A method comprising: obtaining a process model representative of an object to be generated through additive manufacture; generating, based on the process model and using a hybrid machine-learning model, an instruction for generating the object through additive manufacture; generating a layer of an object according to the instruction; taking a reading relative to the generation of the layer; comparing the reading to a threshold of the instruction; adjusting, based on the comparison of the reading to the threshold, the instruction; updating, based on the reading and using a hybrid machine-learning model, the process model; generating, based on the updated process model and using the hybrid machine-learning model, an updated instruction for generating a subsequent layer of the object through additive manufacture; and generating the subsequent layer of the object according to one or more of the adjusted instruction and the updated instruction.

Embodiment 22: A method comprising: A method comprising: obtaining a process model representative of an object to be generated through additive manufacture; generating one or more layers of an instance of the object; taking a reading relative to the generation of the one or more layers; updating the process model based on the reading; further training a hybrid machine-learning model using the reading; generating, based on the updated process model and using the further-trained hybrid machine-learning model, an instruction for generating the object through additive manufacture; and generating a subsequent instance of the object according to the instruction.

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the present disclosure as hereinafter claimed along with their legal equivalents. In addition, features from one embodiment may be combined with features of another embodiment while still being encompassed within the scope of the present disclosure.

What is claimed is:

1. A method comprising:

obtaining a process model representative of an object to be generated through additive manufacture;

generating, based on the process model and using a hybrid machine-learning model, an instruction for generating the object through additive manufacture, the instruction comprising a threshold for additive manufacturing based, at least in part, on a correlation between input area energy density and emitted power; and generating the object through additive manufacture according to the instruction comprising:

generating a layer of the object;

taking a reading relative to the generation of the layer;

comparing the reading to the threshold of the instruction;

adjusting, based on the comparison of the reading to the threshold, and using the hybrid machine-learning model, the instruction, the adjustment, based at least in part, on the correlation between the input area energy density and the emitted power; and generating a subsequent layer of the object according to the adjusted instruction.

2. The method of claim 1, wherein the hybrid machine-learning model was trained using simulated data and measured data.

3. The method of claim 1, further comprising training the hybrid machine-learning model using simulated data and measured data.

4. The method of claim 1, further comprising generating the process model based on a build file.

5. The method of claim 1, wherein the hybrid machine-learning model was trained using data exhibiting the correlation between the input area energy density and the emitted power.

6. The method of claim 1, wherein the instruction further comprises an adjustment for additive manufacture responsive to a crossing of the threshold, the adjustment, based at least in part, on the correlation between the input area energy density and the emitted power.

7. The method of claim 1, wherein the reading is indicative of a temperature at a location of the layer and the adjusted instruction includes information related to operation of an energy source configured to provide energy for additive manufacture.

8. The method of claim 1, wherein the reading is indicative of one or more of: emissive power, energy density, intensity, scaled temperature, powder-bed depth, powder-bed density, a degree of vibration of a recoater, acoustic emissions, a degree of humidity, and a strength of an electromagnetic field at one or more locations of the layer and the adjusted instruction includes information related to one or more of: gas-flow speed, recoating direction, laser power, laser focus, scan speed, scan pattern, scan strategy, scan interval time, layer thickness, hatch spacing, and hatch distance.

9. The method of claim 1, wherein the reading that does not satisfy the threshold is indicative of an anomaly and the adjusted instruction includes information related to the anomaly.

10. The method of claim 9, wherein the adjusted instruction, based at least in part on the correlation between the input area energy density and the emitted power, includes information for correcting the anomaly while generating the subsequent layer.

11. The method of claim 10, wherein generating the object through additive manufacture according to the instruction further comprises correcting the defect while generating the subsequent layer of the object according to the adjusted instruction.

12. A method comprising:

generating a layer of an object according to an instruction generated based on a process model and using a hybrid machine-learning model, the instruction comprising a threshold for additive manufacturing based, at least in part, on a correlation between input area energy density and emitted power;

taking a reading relative to the generation of the layer;

comparing the reading to the threshold of the instruction;

adjusting, based the comparison of the reading to the, and using a hybrid machine-learning model, the instruction, the adjustment, based at least in part, on the correlation between the input area energy density and the emitted power; and generating a subsequent layer of the object according to the adjusted instruction.

13. The method of claim 12, wherein the hybrid machine-learning model was trained using simulated data and measured data.

14. The method of claim 12, further comprising, adjusting the process model, prior to updating the process model, generating the process model based on a build file.

15. A system for additive manufacture, the system comprising:

a simulator configured to generate a process model according to a build file, the process model representative of an object to be generated through additive manufacture;

a hybrid machine-learning model trained using simulated data and measured data, the hybrid machine-learning model configured to generate, based on the process model, an instruction for generating the object, the instruction comprising a threshold for additive manufacturing based, at least in part, on a correlation between input area energy density and emitted power; and an object generator configured to generate an object through additive manufacture according to the build file and the instruction: comprising:

generating a layer of the object;

taking a reading relative to the generation of the layer;

comparing the reading to the threshold of the instruction;

adjusting, based on the comparison of the reading to the threshold, and using the hybrid machine-learning model, the instruction, the adjustment, based at least in part, on the correlation between the input area energy density and the emitted power; and generating a subsequent layer of the object according to the adjusted instruction.

* * * * *